United States Patent [19]

Eldert

[11] 3,790,959

[45] Feb. 5, 1974

[54] CAPACITIVE READ ONLY MEMORY

[75] Inventor: Cornelius Eldert, Ypsilanti, Mich.

[73] Assignee: Burroughs Corporation, Detroit, Mich.

[22] Filed: June 26, 1972

[21] Appl. No.: 265,963

[52] U.S. Cl. ......... 340/172.5, 340/173 SP, 307/218, 328/94

[51] Int. Cl. ............................................ G11c 17/00

[58] Field of Search ...... 340/172.5, 173 CA, 173 R, 340/173 SP, 174 SP; 307/218; 328/94

[56] References Cited

UNITED STATES PATENTS

| | | | |
|---|---|---|---|
| 3,681,764 | 8/1972 | Conant | 340/173 R |
| 3,400,379 | 9/1968 | Harman | 340/172.5 |
| 3,593,304 | 7/1971 | Gardner | 340/172.5 |
| 3,593,317 | 7/1971 | Fleisher | 340/172.5 |
| 3,681,761 | 8/1972 | Schuenemann | 340/172.5 |
| 3,350,691 | 10/1967 | Faulis | 340/173 CA |
| 3,678,473 | 7/1972 | Wahlstrom | 340/173 CA |
| 3,701,120 | 10/1972 | Charters | 340/173 CA |

*Primary Examiner*—Paul J. Henon
*Assistant Examiner*—John P. Vandenburg
*Attorney, Agent, or Firm*—Ralzemond B. Parker; Edwin W. Uren; Edward G. Fiorito

[57] ABSTRACT

A capacitive read only memory operable to respond to the logical product of the inputs to the memory. The read only memory consists of a pair of plates or memory planes capacitively coupled together. Circuitry logically inverts the input pulses to the first plane and selective capacitor placement creates pulsing on all outputs from the second plane except on the desired output. Circuitry logically inverts the pulses from the second plane resulting in an output which is the logical product of the input signals.

7 Claims, 4 Drawing Figures

CAPACITIVE READ ONLY MEMORY

BACKGROUND OF THE INVENTION

1. Field of the Invention

This invention provides circuit means for generating the logical product in a composable capacitive read only memory. The semiconductor composable read only memory in the present state of the art is a large micro-logic array of semiconductor cells fabricated on a single silicon chip using MOS technology. One significant use of the composable capacitive read only memory or CCROM, is in developing prototypes of computer oriented products and for debugging new products. These CCROM's are "field alterable," that is, various logic connections may be changed on location during development debugging. It is therefore unnecessary to require a new memory to be fabricated each time an error is detected in the logic or each time a different logic sequence is to be evaluated.

2. Description of the Prior Art

The read only memory, or ROM, has been used for several years in semiconductor and capacitive forms. However, capacitive read only memories operate to provide the logical OR, or sum function. Prior to the present invention it was not known how to operate the capacitive read only memory to provide the logical AND or product function.

SUMMARY OF THE INVENTION

In view of the inability of the prior art techniques to provide a capacitive read only memory operable to generate the logical product of the input signals, it is an object of the present invention to provide a composable capacitive read only memory operable in such a fashion.

It is a further object of the present invention to provide a capacitive read only memory which may be cascaded with other memories to provide various logical functions such as AND-OR, AND-AND, OR-OR, OR-AND and similar combinations of three or more memories.

These and other objects and advantages of the present invention are accomplished in a capacitive read only memory including input gating means to logically invert the input pulses, pulsing all output lines of the CROM except the desired line, and output logical inverting means for providing an output only for the non-pulsing line.

DESCRIPTION OF THE DRAWINGS

The foregoing objects and advantages of the present invention, together with other advantages which may be attained by its use, will be apparent upon reading the following detailed description taken in conjunction with the drawings. In the drawings wherein like numerals identify corresponding parts.

DESCRIPTION OF THE PREFERRED EMBODIMENT

Figure 1:
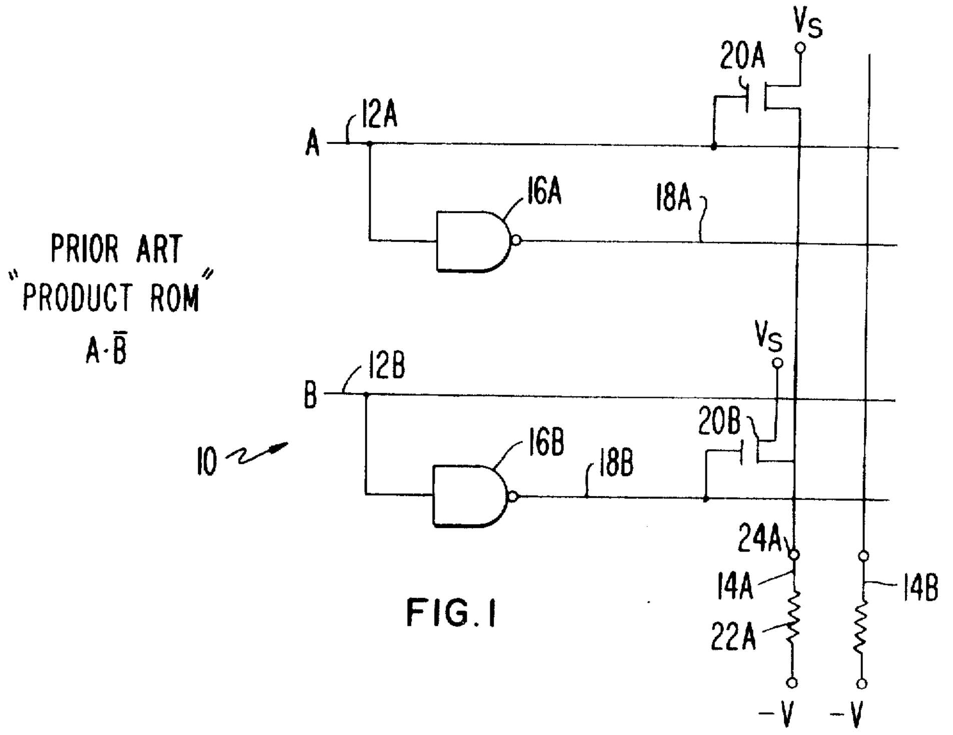
FIG. 1 illustrates a prior art semiconductor "product ROM; "

In order to set the present invention in its proper perspective, a brief description of the prior art read only memories will be beneficial. With reference first to FIG. 1 there is illustrated a prior art ROM 10 connected to provide the logical product or AND function. The ROM 10 contains a plurality of input lines 12A, 12B and a plurality of output lines 14A, 14B. Each "true" input line 12A, 12B branches through an inverter 16A, 16B, respectively to a corresponding complement input line 18A, 18B. Selected true and complement lines are connected via MOS transistors to the appropriate output lines 14A, 14B depending upon the logic desired from the read only memory. In the illustration of FIG. 1, if it is desired to form the logical product A · B′, the input line 12A which reflects the signal A is connected via a MOS transistor 20A to sense line or output line 14A. This connection is made by coupling the gate of the MOS to input line 12A, the source electrode to a voltage $V_S$ and the drain electrode through a resistor 22A to a source of negative potential (or, alternatively, to ground).

The complement of the signal B, which appears on line 18B, is connected via MOS 20B to the output line 14A.

The operation of the circuit is as follows: If line 12A is active and line 12B is inactive, MOS 20A and 20B are both "Off" and output 24A is at −V. Otherwise, output 24A is at $V_S$ potential. Thus the product A · B′ is sensed.

Figure 2:
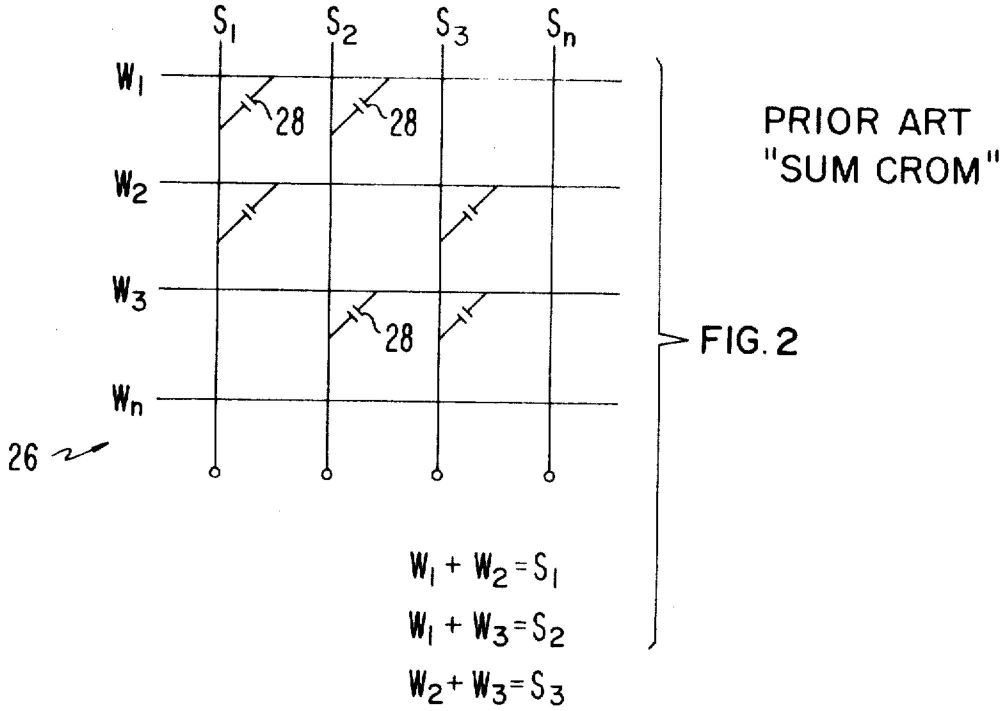
FIG. 2 illustrates a prior art "sum CROM;"

Having thus explained the operation of the prior art "product" ROM, the operation of the prior art capacitive ROM, which operated only in the logical OR mode prior to the present invention will be explained. With reference to FIG. 2 the capacitive ROM, or CROM 26 includes a plurality of input or word lines $W_1$, $W_2$, $W_3$. . . $W_n$ in a first plane and a plurality of sense or output lines $S_1$, $S_2$, $S_3$. . . $S_n$ in a second plane. Various word lines and sense lines are capacitively coupled 28 depending upon the arbitrary logic which the memory is designed to perform. In the present illustration if it is desired to activate sense line $S_1$ upon the pulsing of $W_1$ or $W_2$ then the intersection of $W_1$ and $S_1$ is capacitively coupled and intersection of $W_2$ and $S_1$ is capacitively coupled. A signal on $W_1$ or $W_2$ or both, through the capacitive coupling, generates an output pulse on line $S_1$. A table is included as part of FIG. 2 to show the various logical conditions preselected with the CROM 26 of FIG. 2.

Thus it may be seen that in the prior art CROM only the logical summation or OR mode was attainable prior to the invention described herein, where the logical product or AND mode was desired it was necessary to utilize a non-capacitive memory.

Figure 3:
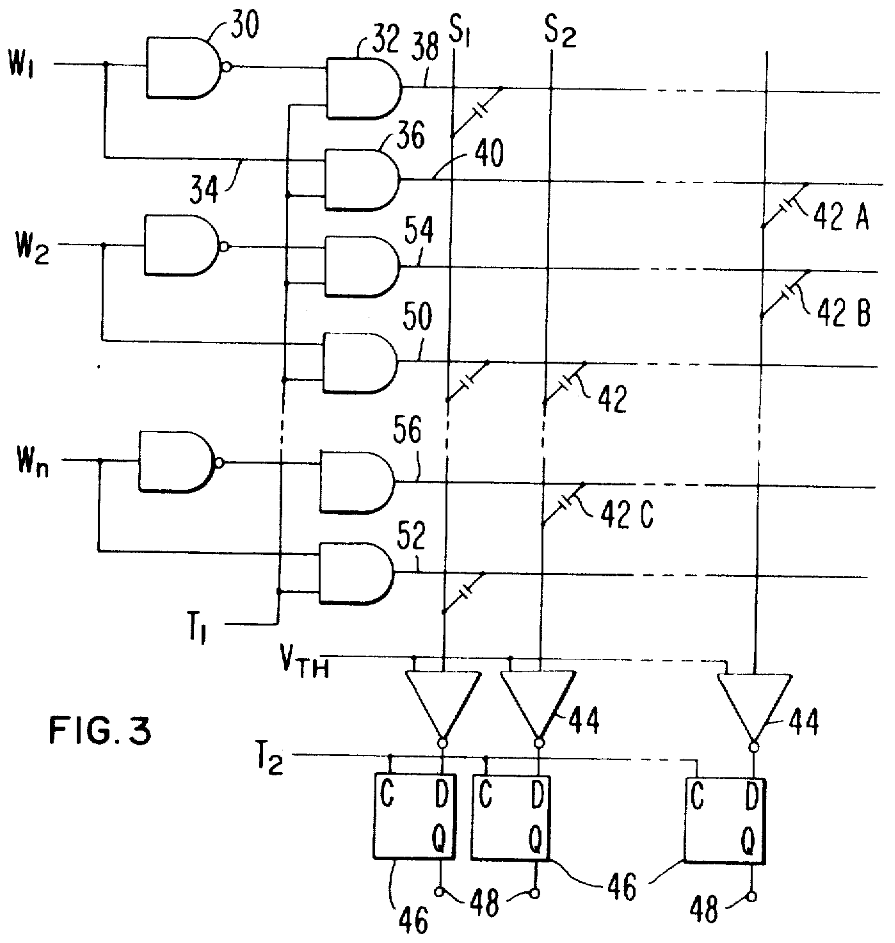
FIG. 3 indicates a CROM operable to provide the logical product according to the principles of the present invention.

With reference now to FIG. 3, there is illustrated a capacitive read only memory or CROM including the inversion circuitry according to the principles of the present invention to permit the CROM to operate in the product mode. The CROM of FIG. 3 includes a plurality of input or word lines $W_1$, $W_2$. . . $W_n$ in a first plane and a plurality of sense or output lines $S_1$, $S_2$. . . $S_n$ in a second plane. Each input line drives the CROM in both true and complement form. One branch of the input line $W_1$ is passed through an inverter 30 and the output thereof is one input to a two input AND gate 32.

This is the complement signal for the input pulse because of the inverter 30. The true input on line 34 is one input to a two input AND gate 36. The second input to each AND gate 32, 36 is a clock pulse at time $T_1$. The output of the first AND gate 32 appears on line 38 and the output of the second AND gate 36 appears on line 40. There is similar logic circuitry for each input line or word line, however it will only be explained for word line $W_1$. Selected word lines are capacitively coupled 42 to predetermined sense lines based on the arbitrary logic which the CROM is intended to perform.

Each sense line $S_1 \ldots S_n$ is connected as one input to a two input inverting gating comparator 44 which performs several functions. The other input to this comparator 44 is a threshold voltage $V_{TH}$. The comparator 44 compares the threshold voltage to the voltage appearing on the sense line and, if the sense line voltage exceeds the threshold voltage, the comparator is gated or enabled. At the same time the output is inverted resulting in a low signal. If the voltage on the sense line is lower than the threshold voltage, the output of the comparator 44 is high or "one."

The output of each comparator 44 serves as one input, the D or data input to a D type flip flop 46. The clock pulse or C input to each D flip flop 46 is applied at time $T_2$. The output of each D type flip flop appears at the Q terminal 48.

Having thus explained the structure of the CROM according to the present invention, the operation under various conditions will now be explained. It should be recalled that the placement of the capacitors 42 coupling the word lines and the sense lines is arbitrarily preselected to provide the desired logic, and this is inverted according to the principles of the present invention as will be explained hereinafter. As a first example, consider the desire to provide an output on sense line $S_1$ for an input pulse on $W_1$ but no input pulse on any other word line. The input pulse on $W_1$ is inverted by inverter 30 and thereby provides a low input to AND gate 32. At clock time $T_1$, the output of AND gate 32 is low and line 38 has no signal thereon. The non-inverted pulse on sense line $W_1$ appears as a high signal on line 34 and thus provides an enabling signal to AND gate 36. Upon the occurrence of the clock pulse $T_1$, line 40 carries a signal which, as seen by the capacitive coupling 42A, serves to activate or pulse sense line $S_n$.

Each input line $W_2 \ldots W_n$ has its corresponding true line 50, 52 and complement line 54, 56 in the first plane. The absence of a pulse on input lines $W_2$ through $W_n$ causes an output pulse on each respective complement line 54, 56 but no output on the true lines 50, 52. Line $W_2$ provides a pulse on complement line 54 which is also capacitively coupled 42B to sense line $S_n$. Input line $W_n$, by virtue of a pulse on its complement line 56 is capacitively coupled 42C to sense line $S_2$. Thus it may be seen that at clock time $T_1$ all the sense lines $S_2$ through $S_n$ are pulsing but $S_1$ is not pulsing. This is part of the "inverted" procedure according to the principles of the present invention; all sense lines except the desired sense lines are pulsing.

Since the voltages on all pulsing sense lines exceed the threshold voltage $V_{TH}$, except any voltage which might appear on non-pulsing sense line $S_1$ (which would indicate a low signal), the comparators 44 indicate that each sense line exceeds its threshold voltage except for sense line $S_1$. However, the inversion of comparators 44 provide an output which is high for sense line $S_1$ but low for all other sense lines. Thus there is a high signal to the D flip flop 46 associated with sense line $S_1$ and a low signal to all other flip flops. The output of each flip flop is taken from each Q terminal 48.

The logical operation of a D flip flop will now be briefly summarized. Information present at the D or data input terminal is transferred to the Q or output terminal when the clock pulse at the C input is high. As long as the clock pulse remains high, the Q output will follow the data input. When the clock pulse goes low, the information that was present at the data input D at the time of the clock pulse transition is retained at the Q output until the clock pulse goes high again.

Returning to the operation of the logic portion of the circuit, just prior to and during the occurrence of a clock pulse $T_2$, the output of comparator 44 associated with sense line $S_1$ was high (because of the inversion since $S_1$ was not pulsing) and the output of all other comparators was low. Thus, during clock pulse $T_2$, and at its conclusion, the D input of flip flop 46 on line $S_1$ is high but the D inputs and consequently the Q outputs of the other flip flops are low. Thus it may be seen from the logic of the present capacitive read only memory that the plurality of inversions provides an output from the flip flop associated with sense line $S_1$ the combination of an input on line $W_1$ but no other input.

A second logic condition which will be explained is an input on lines $W_1$ and $W_n$. The occurrence of a pulse on line $W_1$ appears as a pulse on its true line 40 at clock time $T_1$ and thus sense line $S_n$ will pulse. The absence of a pulse on input line $W_2$, through its inversion provides an output pulse on complement line 54 and also pulsing sense line $S_n$. The pulse on line $W_n$ results in an output pulse on true line 52 and sense line $S_1$ pulses. Since all sense lines are pulsing except sense line $S_2$, only the output 48 from the D flip flop 46 on sense line $S_2$ provides an output pulse at clock time $T_2$ in the manner just described.

One third logic condition frequently utilized is the "don't care" condition. That is, the logic on a particular line is immaterial. For example, suppose it is desired to indicate the absence of a pulse on line $W_1$ and the presence of a pulse on line $W_2$ whether or not a pulse occurs on line $W_n$. Then the absence of a pulse on line $W_1$ results in a pulse at time $T_1$ on line 38 thereby activating sense line $S_1$. The presence of a pulse on line $W_2$ results in a pulse on true line 50 thus pulsing sense lines $S_1$ and $S_2$. Since it is immaterial whether or not a pulse appears on line $W_n$, it is immaterial whether there is a pulse on its lines 52 or 56. In this situation, sense lines $S_1$ and $S_2$ pulse but sense line $S_n$ is not pulsing which will result in a pulse through flip flop 46 on sense line $S_n$.

The operation of the CROM according to the principles of the present invention may thus be summarized as follows. Each input signal drives the capacitive matrix in both true and complement form. By the use of inverters and by preselected capacitive coupling all sense lines except the desired sense line are pulsed in response to the particular input signals. Output inverter logic responsive to the pulsing or non-pulsing condition of the sense line provides an output signal only for those sense lines which are not pulsing. Thus there is "double inversion," the first to select the sense lines and the second to select the output flip flop.

Figure 4:
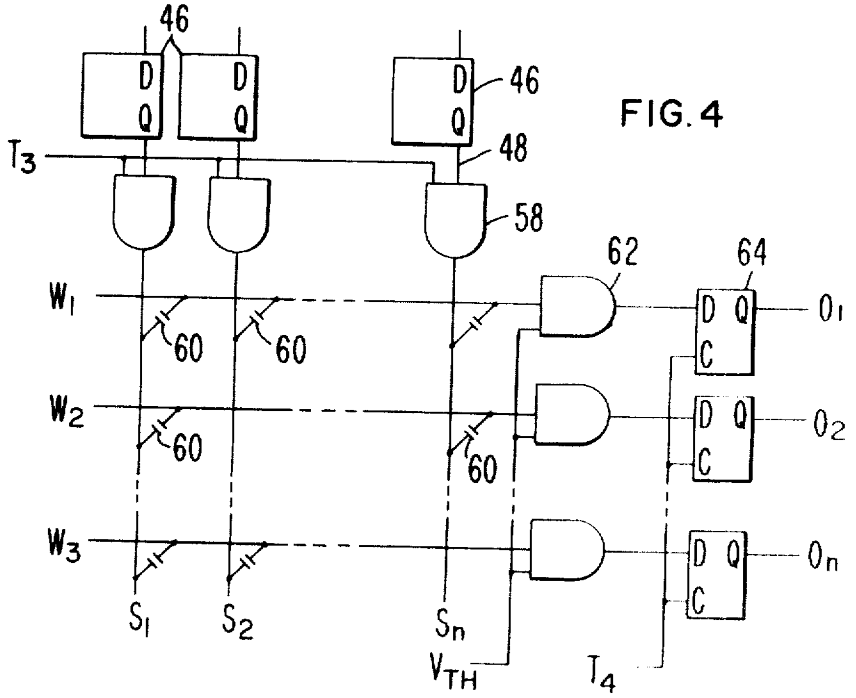
FIG. 4 illustrates the technique for cascading two CROM's together.

Now that the operation of the AND or product CROM has been described, its utility by cascading it with other logical memories or matrices will now be explained. With reference to FIG. 4, there is illustrated a capacitive OR matrix similar to that of FIG. 2 except that the OR matrix of FIG. 4 includes output circuitry. For illustration purposes, the matrix of FIG. 4 includes the flip flops 46 which are actually from the matrix of FIG. 3. The output 48 of each D flip flop 46 serves as one input to a two input AND gate 58, the other input being a clock pulse at time $T_3$. The output of each AND gate 58 is one of the sense lines $S_1$ through $S_n$ respectively for the OR matrix of FIG. 4. The word lines of the matrix of FIG. 4 are identified as $W_1$ through $W_n$ with the capacitive coupling 60 preselectedly based on the logic conditions desired.

Each word line serves as one input to a two input AND gate 62, the output of which serves as the data or D input to a D type flip flop 64. The outputs $O_1$ through $O_n$ of the D type flip flops 64 are taken from the Q terminals. The other input to each AND gate 62 is a threshold voltage $V_{TH}$. The clock input or clock pulse to each flip flop 64 occurs at time $T_4$.

The operation of the cascaded CROM's of FIGS. 3 and 4 will now be explained. Only the logic identified with the first and second example of the explanation of FIG. 3 will be illustrated herein, since that will be sufficient for the understanding of the principles of this invention. It may be recalled that the AND CROM of FIG. 3, in response to an input pulse only on input line $W_1$ created an output pulse only from the flip flop 46 associated with sense line $S_1$. If it is desired to provide an output pulse on all output word lines $O_1$ through $O_n$ when sense line $S_1$ of FIG. 4 is activated, then capacitors 60 should be coupled to the intersection of sense line $S_1$ and each word line $W_1$ through $W_n$ in the CROM of FIG. 4. Then, the presence of a pulse from the output of flip flop 46 associated with the sense line $S_1$ of FIG. 3 will be gated, at time $T_3$, to sense line $S_1$ in the CROM of FIG. 4. The capacitive coupling will activate all the word lines $W_1$ through $W_n$ in the CROM of FIG. 4 and, since these all will exceed the threshold voltage, all the gates 62 will be enabled thereby providing data at the D input to each flip flop 64. When the clock pulse $T_4$ goes low, the output on the Q terminal of each flip flop 64 will retain the signal which appeared at the time the clock pulse changed. Thus each output $O_1$ through $O_n$ will provide an output signal.

The second condition explained with reference to FIG. 3 was the condition of an input pulse on line $W_1$ and $W_n$. It will be recalled that this resulted in an output signal only from flip flop 46 associated with sense line $S_2$. If it is desired to provide outputs on lines $O_1$ and $O_n$ of FIG. 4 when the flip flop 46 associated with the sense line $S_2$ of FIG. 3 is pulsing, capacitive coupling 60 between sense line $S_2$ and both $W_1$ and $W_n$ will be needed to provide such an output. Then, in the manner just described, both $W_1$ and $W_n$ will be pulsed above the threshold voltage $V_{TH}$, AND gates 62 associated with $W_1$ and $W_n$ will be enabled, and flip flops 64 associated with $W_1$ and $W_n$ will provide output pulses.

Thus there has been shown and described a capacitive read only memory operable in the logical product mode by the inversion of the input signal and the inversion of the output signal. It has also been shown that the output of the product matrix can be cascaded as the input of another matrix. While an OR matrix has been shown in FIG. 4, it must be appreciated that the various sense lines of FIG. 3 can serve as the sense lines of any logical matrix as desired. Furthermore the specific circuitry for performing the two inversions may be varied without departing from the spirit and scope of my invention. Such variations are well known to those skilled in the art. Depending upon the type of inversion circuitry utilized of course, different types of output flip flops having different timing and logic characteristics may be utilized. An important aspect of my invention is in the strobing or pulsing of all sense lines except the desired sense line and this may only be performed by the use of a logical inversion prior to the input to the capacitive coupling and a subsequent inversion at the output of the sense lines to provide the desired output.

I claim:

1. In a capacitive read only memory including a matrix having a plurality of word paths and sense paths selectively capacitively coupled together, the improvement of circuit means for inverted operation of said capacitive read only memory for providing the logical product of input signals comprising:

input means electrically coupled to said word paths and dividing each such path into a true and a complement signal line, means for delivering input pulses to the true signal lines and inverting such input pulses on said complement signal lines, a double input terminal AND gate in each true and complement signal line and receiving each input pulse on one of its two input terminals, means for pulsing all of the sense paths except a desired sense path, said pulsing means including means for applying a strobe pulse for each input pulse to the other of said input terminals of said AND gates for enabling the same, and output means for logically inverting the signals on all sense paths and thereby providing an output signal on said desired sense path for indicating the logical product of said input pulses.

2. In a capacitive read only memory according to claim 1 wherein each said sense path has a register for storing an output signal conveyed by its respective sense path, each such register being normally in a first logical state but being responsive to an output signal on its respective sense path for switching to a second logical state.

3. In a capacitive read only memory according to claim 2 wherein each such register has a second logical state output and wherein a second matrix of electrically coupled word paths and sense paths has its word paths respectively electrically connected to the second logical state outputs of said registers.

4. A capacitive read only memory comprising:

a matrix having a plurality of sense lines selectively capacitively coupled to predetermined word lines wherein an enabling signal on one of said word lines is coupled to selected ones of said sense lines, logic means electrically coupled to said word lines of said matrix and dividing said word lines into a plurality of sets each having two lines where one line of each of said sets is electrically connected through inversion means to said other line whereby the electrical signal on said one line is a complement of the electrical signal on said other line, a plurality of buffer registers operatively and electrically coupled respectively to each one of said sense lines of said matrix, said registers being normally in a first logical state and responsive to a signal on its respective sense line for switching its associated buffer register from said first state to a second logical state, means for applying an electrical strobe pulse to all of said sense lines except those sense lines receiving an enabling signal from one of said word lines, and means for logically inverting the signals on said sense lines with the result that only those buffer registers associated with the sense lines which bear signals after said inversion takes place are switched to said second logical state.

5. A composable read only memory comprising:

a first matrix having a plurality of sense lines selectively capacitively coupled to predetermined word lines wherein an enabling signal on one of said word lines is coupled to selected ones of said sense lines, a plurality of buffer registers operatively and electrically coupled respectively to each one of said sense lines, said registers normally in one logical state and responsive to a signal from said first matrix for switching said buffer register from said normal state to a switched logical state, a second matrix having a plurality of word lines each electrically coupled to the switched logical state output of each of said buffer registers wherein an enabling signal from said switched logical state of said buffer registers is coupled to selected ones of said word lines of said second matrix, logic means electrically coupled to said word lines of said first matrix for dividing said word lines into a plurality of sets wherein an electrical signal applied to said logic means for one of said sets will energize only one word line in said set for enabling said first matrix and will deenergize all other word lines of said set, and whereby said first matrix is a product generator performing a logical AND function.

6. A composable read only memory according to claim 5 additionally including a plurality of buffer registers operatively and electrically coupled respectively to each of said sense lines of said second matrix said registers normally in one logical state and responsive to a signal outputted from said second matrix on said sense lines for switching said buffer from said normal state to a switch logical state.

7. A composable read only memory according to claim 5 wherein said logic means divides said word lines into a plurality of sets having two lines each where one line of each of said sets is electrically connected through an inversion means to said other line whereby the electrical signal on said one line is a complement of the electrical signal on said other line.

* * * * *